L. SCHWITZER.
LUBRICATING SYSTEM FOR FANS.
APPLICATION FILED AUG. 11, 1919.

1,355,277.

Patented Oct. 12, 1920.

INVENTOR.
LOUIS SCHWITZER.
BY
Lockwood Lockwood
ATTORNEYS

UNITED STATES PATENT OFFICE.

LOUIS SCHWITZER, OF INDIANAPOLIS, INDIANA, ASSIGNOR TO AUTOMOTIVE PARTS COMPANY, OF INDIANAPOLIS, INDIANA, A CORPORATION.

LUBRICATING SYSTEM FOR FANS.

1,355,277.  Specification of Letters Patent.  Patented Oct. 12, 1920.

Application filed August 11, 1919. Serial No. 316,854.

*To all whom it may concern:*

Be it known that I, LOUIS SCHWITZER, a citizen of the Republic of Czechoslovakia, having declared my intention of becoming a citizen of the United States, and a resident of Indianapolis, county of Marion, and State of Indiana, have invented a certain new and useful Lubricating System for Fans; and I do hereby declare that the following is a full, clear, and exact description thereof, reference being had to the accompanying drawings, in which like numerals refer to like parts.

This invention relates to a fan construction, and more particularly to the bearing construction and oiling system therefor. It is the main object of this invention to so construct the bearings in the fan hub that it will in itself produce a centrifugal force oil feed between the spindle and the surface of the bearing, whereby the bearing surface will at all times be supplied with a film of oil so long as there is any appreciable supply of oil in the reservoirs or chambers. This is accomplished by means of providing in the bearings a plurality of eccentrically disposed oil reservoirs and passageways in which the oil is drawn from the reservoir by the centrifugal force of the rapidly revolving fan hub and bearing about the stationary spindle and the forcing of the oil by the centrifugal force and eccentricity of the chambers through the reduced portion of the reservoirs whereby the oil will be under such pressure as will force it between the bearing surfaces. By means of this invention an ordinary gray iron bearing may be used to advantage, and its lubrication assured as long as any oil is contained in the oil reservoirs.

Figure 1:
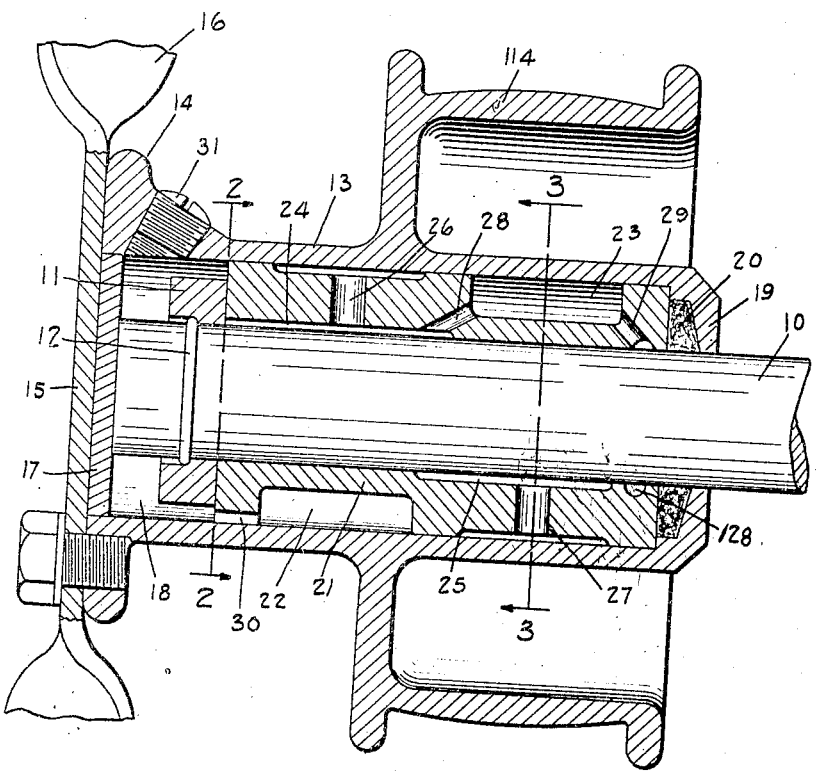
Figure 2:
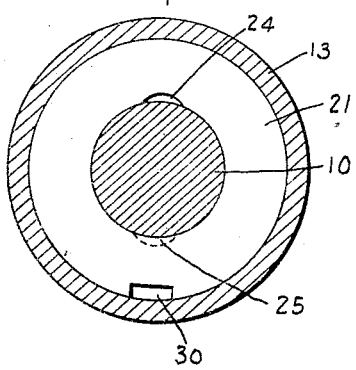
Figure 3:
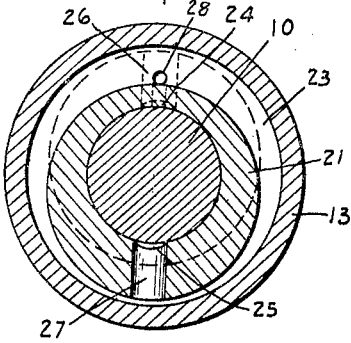

In the accompanying drawings which are made a part of this application Figure 1 is a central vertical cross section through the bearing construction. Fig. 2 is a cross section taken on a line 2—2 of Fig. 1. Fig. 3 is a cross section taken on a line 3—3 of Fig. 1.

In the drawings there is shown a fan construction having a stationary spindle 10 rigidly secured to the fan support. Mounted on the outer end of said spindle there is an end thrust bearing 11 locked thereon by the ring 12. Surrounding the spindle there is a fan hub 13 having a fan belt pulley 114 integral therewith. The outer end of the hub 13 is provided with a flange 14 upon which the fan plate 15 is bolted, having the fan blade 16 integral therewith. The outer end of the hub 13 is sealed by the plate 15 for retaining oil in the oil reservoir 18. The inner end of the hub is closed by the inwardly extending flange 19 which incloses the packing 20 for preventing the oil within said hub from escaping from the inner end thereof. The plate 17 is mounted between the fan plate 15 and the shaft 10 for taking up end thrust.

Mounted within the hub and rigid therewith there is a bearing 21 through which the spindle 10 extends, said spindle being stationary and the bearing 21 adapted to revolve with the fan pulley and hub, with its bearing surface engaging said spindle and its end bearing surface engaging the end thrust bearing 11 which is rigidly mounted on the outer end of said spindle. The periphery of the bearing is provided with eccentric oil reservoirs or chambers 22 and 23 being formed therein off center and having their reduced portions opposite each other, as shown in Figs. 1 and 3. The inner bearing surface of the bearing 21 is provided with oppositely disposed longitudinal oil grooves 24 and 25 opposite the chambers 22 and 23 respectively, and connected with the reduced portion of said reservoirs by the passageways 26 and 27, respectively whereby the oil carried in said chambers will be under high pressure when passing around the reduced portion thereof by centrifugal force, and will be forced through the passages 26 and 27 into the grooves 24 and 25 and against the surface of the spindle 10 as the bearing revolves, for oiling the surface thereof. The groove 24 is connected with the enlarged portion of the chamber 23 by the oil passage 28, whereby the oil fed into the groove 24 under pressure is forced through said passage to feed the chamber 23. A circular groove 128 is provided about the inner bearing surface of the bearing near the inner end thereof, and is connected to the chamber 23 by the passage 29, whereby the greater amount of oil forced along the bearing surface of said bearing will accumulate in the groove 128 and pass back through the passage 29 into the chamber 23, permitting only a very small portion thereof to seep through and oil the remaining small bearing surface of the inner end of the bearing, so that no great amount of oil will pass through to the packing 20 or will be wasted. In the outer end of the bearing 21 there is an oil passage 30 extending longitudinally adjacent the periphery thereof from the oil reservoir to the chamber 22. The oil reservoir 18 is provided with a filling plug 31.

In operation the oiling system works as follows, provided the oil reservoir 18 is sufficiently filled with oil and the fan and hub are revolving about the spindle 10 at a comparatively high speed, the oil which will pass through the passage 30 into the chamber 22 and extend therein to substantially the same level as it stands in the oil reservoir when the fan is at rest, will be compressed by the revolving of the hub when it is passed through the reduced portion of the chamber and be forced under pressure through the passage 26 to the longitudinal groove 24. The oil being in the longitudinal groove 24 under pressure will continuously force its way between the end bearing surface of the bearing 21 and end thrust bearing 11 so that that surface will be always provided with a film of oil and will also continuously provide a film of oil under pressure about the surface of the spindle 10. The continuous forcing of the oil into the groove 24 will cause it to be fed into the chamber 23 through the passage 28 so that said chamber will be supplied with oil and will feed the oil under pressure through the passage 27 to the groove 25 for oiling the inner portion of the spindle 10. The pressure of oil exerted in the groove 25 will feed it to the rear bearing surface, any excess being gathered in the groove 28 and forced back through the passage 29 to the chamber 23. It will, therefore, be seen from the above description that by the construction of various oil chambers and passageways in the bearing there will be a continuous automatic oil feed under pressure to the bearing surface.

The invention claimed is:

1. A fan construction having a stationary spindle, a hub adapted to revolve about said spindle, a bearing mounted between said spindle and hub, and an eccentrically disposed reservoir surrounding the periphery of said bearing in communication with said spindle for supplying oil contained therein and forcing it under pressure against the surface thereof.

2. A fan construction including a stationary spindle, a fan hub adapted to revolve about said spindle, a bearing mounted between said spindle and hub in fixed relation to said hub, an eccentrically disposed reservoir about the periphery of said bearing in communication with said spindle, said reservoir having a reduced portion, and an oil groove extending longitudinally of said bearing in the bearing surface thereof in communication with said reduced portion, whereby oil contained therein will be forced into said groove when passing under pressure through said reduced portion, for supplying oil to the bearing surface of said bearing.

3. A fan construction having a fixed spindle, a fan hub adapted to revolve about said spindle, and a bearing mounted between said hub and spindle provided with eccentrically disposed annular chambers for containing oil and feeding it to said spindle.

4. A fan construction having a stationary spindle, a fan hub adapted to revolve about said spindle, a bearing mounted between said spindle and hub in fixed relation to the latter, an oil reservoir in said hub, an end thrust bearing fixedly mounted on said spindle against which said bearing is adapted to abut, an eccentrically disposed chamber about the periphery of said bearing, a second eccentrically disposed chamber about the periphery of said bearing and oppositely disposed to said first mentioned chamber, whereby said chambers will have oppositely disposed reduced portions, passageways communicating with their reduced portion and said spindle, whereby oil drawn into said chambers will be forced under pressure when passing through their reduced portions to said spindle for lubricating the surface thereof, and a passageway connecting the bearing surface with the enlarged portion of one of said chambers for supplying oil thereto.

5. A fan construction having a stationary spindle, a fan hub adapted to revolve about said spindle, a bearing mounted between said spindle and hub in fixed relation to the latter, an oil reservoir in said hub, an end thrust bearing fixedly mounted on said spindle against which said bearing is adapted to abut, an eccentrically disposed chamber about the periphery of said bearing, a second eccentrically disposed chamber about the periphery of said bearing and oppositely disposed to said first mentioned chamber, whereby said chambers will have oppositely disposed reduced portions, longitudinally extending oil grooves in said bearings adjacent said spindle in communication with said reduced portion, whereby oil drawn into said chambers will be forced under pressure when passing through said reduced portions to said grooves for oiling the surface of said spindle, a passageway connecting one of said grooves with the enlarged portion of one of said chambers for supplying oil thereto, and means in said bearing for collecting the oil passing along the rear surface of said spindle and returning it to one of said chambers.

In witness whereof, I have hereunto affixed my signature.

LOUIS SCHWITZER.